United States Patent [19]

Kee

[11] Patent Number: 4,919,561
[45] Date of Patent: Apr. 24, 1990

[54] CERAMIC FITTING FOR TUBULAR FURNITURE CONSTRUCTION

[76] Inventor: Peter M. Y. Kee, Flat 1002, Block A, 10th Floor, Lotto Villa 18 Broadwood Road, Happy Valley, Hong Kong

[21] Appl. No.: 325,669

[22] Filed: Mar. 20, 1989

[51] Int. Cl.⁵ .......................... A47C 19/00; F16D 1/00
[52] U.S. Cl. ..................................... 403/305; 403/192; 403/306; 403/332; 403/353; 5/281; 5/282 R
[58] Field of Search ............... 403/300, 303, 305, 306, 403/307, 332, 299, 192, 165, 200, 353, 286, 341, 345; 5/281, 282 R; 242/129.5, 68.4; 285/31

[56] References Cited

U.S. PATENT DOCUMENTS

| | | | |
|---|---|---|---|
| 838,178 | 12/1906 | Gibson | 5/281 |
| 1,082,165 | 12/1913 | Mainker | 5/281 |
| 1,932,794 | 10/1933 | McArthur | 403/347 |
| 2,035,488 | 3/1936 | McArthur | 5/279 R |
| 2,212,455 | 8/1940 | Reed | 403/170 X |
| 3,273,922 | 9/1966 | Rasor | 403/42 |
| 3,414,912 | 12/1968 | Dusey et al. | 5/52 |
| 3,927,451 | 12/1975 | Rogers | 403/286 X |
| 4,294,560 | 10/1981 | Larkin | 403/351 X |
| 4,454,376 | 6/1984 | Holder et al. | 403/43 |
| 4,671,698 | 6/1987 | Klingstedt | 403/341 |
| 4,679,261 | 7/1987 | Stanley et al. | 5/183 |

FOREIGN PATENT DOCUMENTS

| | | | |
|---|---|---|---|
| 583865 | 10/1958 | Italy | 285/31 |
| 187067 | 12/1963 | Switzerland | 285/31 |
| 18256 | of 1893 | United Kingdom | 5/281 |

Primary Examiner—Andrew V. Kundrat
Assistant Examiner—Franco S. Deliguori
Attorney, Agent, or Firm—Rhodes, Coats & Bennett

[57] ABSTRACT

An ornamental ceramic fitting is mounted between two spaced, confronting, axially aligned, tubular members. The distance between the confronting ends of the tubular members is less than the corresponding axial length of the ceramic fitting. The ceramic fitting includes a threaded rod extending therethrough along the axis thereof and a well in each end of the fitting surrounding the threaded rod. The depth of the well in one end exceeds the difference between the axial length of the fitting and the corresponding axial distance between the confronting ends of the tubular members. The fitting is first placed on the end of one of the spaced tubular members and twisted to a position past the normal seated position. This allows proper alignment of the end of the other tubular member, whereupon the fitting is twisted in the opposite direction to properly complete the mounting operation.

8 Claims, 2 Drawing Sheets

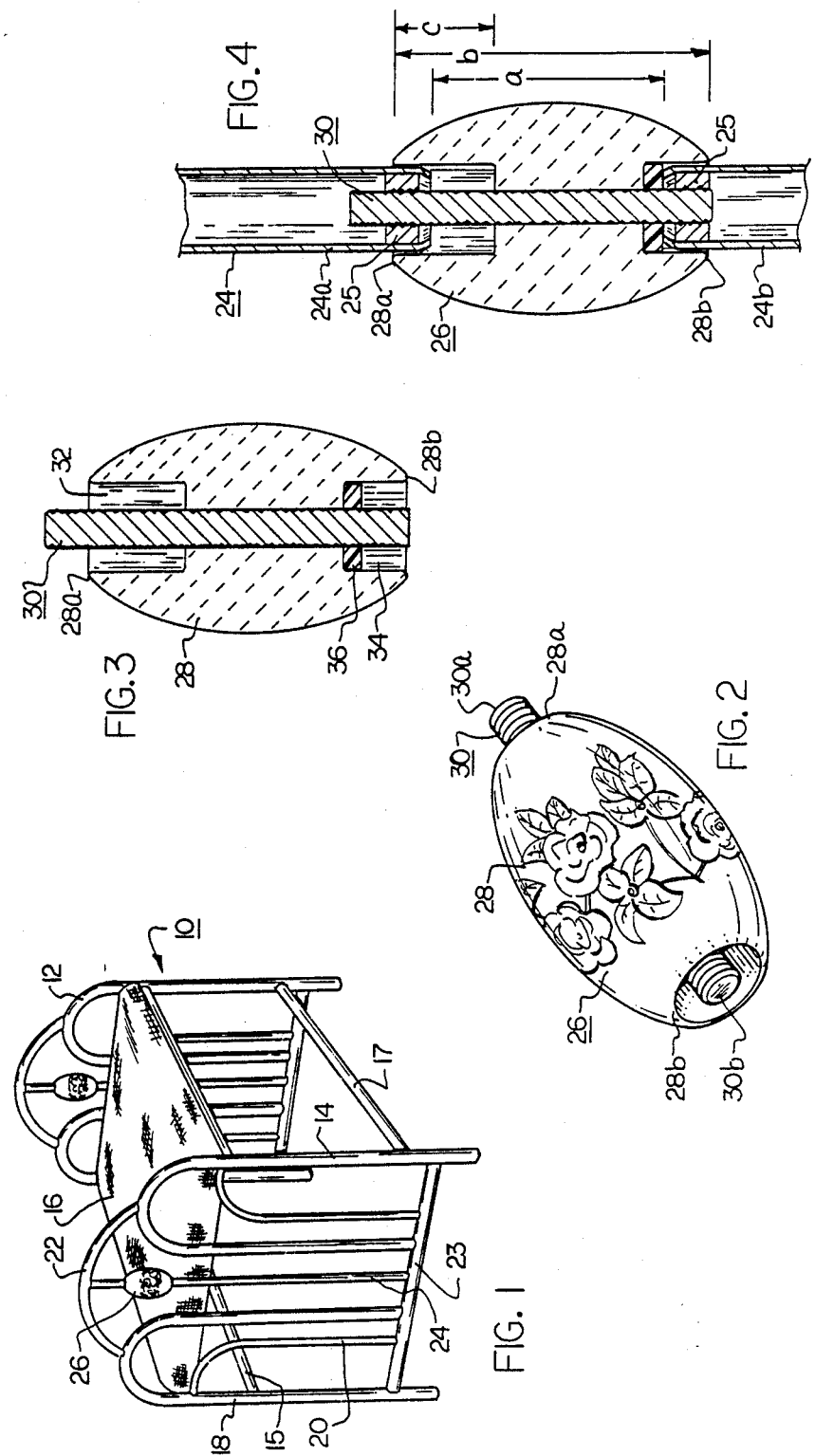

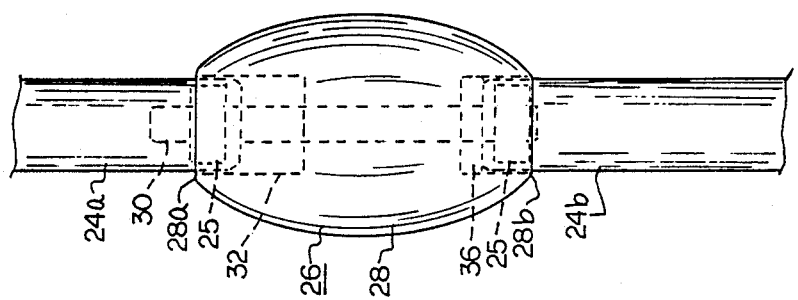
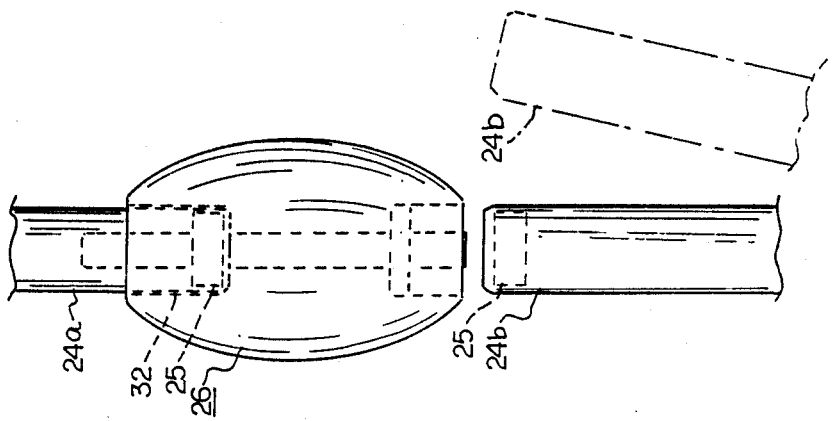
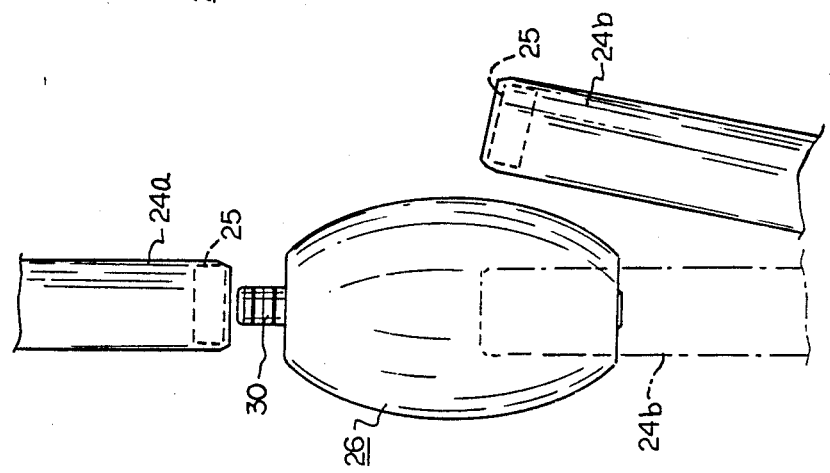

CERAMIC FITTING FOR TUBULAR FURNITURE CONSTRUCTION

BACKGROUND AND SUMMARY OF THE INVENTION

This invention is directed to tubular furniture construction, and more specifically, to a ceramic fitting or connector which joins two spaced, confronting, axially aligned, tubular members, and when assembled, appears to envelop both ends of the confronting tubular members.

The furniture industry has, in recent years, developed several distinct furniture categories. One of such furniture categories is a line of occasional pieces, including shelf units, vanities, seats, tables, etageres, and the like, which are formed primarily of tubular metallic pieces and glass. The tubular pieces may be either round or rectangular in cross-section and formed of brass, aluminum, chrome, or various lightweight metallic alloys. Quite a number of distinct patterns and decorative ideas have emerged for use in conjunction with such types of construction.

The present invention is directed toward one of such decorative type innovations. Often in such tubular furniture, there may be unbroken lengths of parallel tubular members in an end or rear wall. The inclusion of some type of decorative or ornamental fitting or coupling in one or more of the tubular members provides an aesthetic break. The problem is how to assemble such an attractive ornamental coupling after the end wall is formed and plated. Such items as finials and husks or sleeves which slide over the tubular members have been proposed.

In the present invention, a rather different type of decorative fitting is provided in the form of a ceramic (preferably porcelain) knob-like member which replaces a section of one or more tubular members. The fitting of the present invention has a diameter greater than the diameter of the aforesaid tubular members, so that the tubular members can extend into and be enveloped by the ceramic fitting. The surface of the ceramic fitting may be decorated by decals or screen printing. However, the novelty of the invention lies in the manner in which the decorative fitting is fabricated and assembled between spaced, confronting, axially aligned, tubular members to envelop the ends of the tubular members and give the appearance of replacing a section of tubing.

Toward this end, a wall or end standard is first formed by joining the tubular members together by some appropriate technique such as welding. One or more tubular members is then left with a gap or space therein which forms two spaced, confronting, axially aligned, ends. The ceramic fitting to be emplaced between the confronting ends of the tubular member(s) is greater in length than the space therebetween, whereby when assembled, the fitting envelops the tubular ends.

To achieve such an effect, a rod extends axially through the ceramic fitting. Preferably, but not necessarily, the rod is threaded and protrudes longitudinally past one of the ends of the fitting for enhanced stability. Wells are formed in each end of the coupling surrounding the threaded rod. One of the wells is of a depth dimension greater than the distance by which the axial length of the ceramic fitting exceeds the distance between the confronting ends of the tubes.

So arranged, one end of the fitting is assembled onto one of the tubular members with the rod first inserted into the tubular member to a point past the normal seated position. The extended position exceeds the normal position by the aforesaid difference between the axial length of the fitting and the distance between the confronting ends of the tubular members. The end of the other tubular member is then placed in position aligned with the opposite end of the fitting. The rod at the other end of the fitting is inserted into the tubular member and moved in the opposite direction to properly seat the fitting in position on both of the tubular members. In order to cushion the seating of the ceramic fitting on the tubular ends, one or both of the wells are provided with rubber-pads in the bottom wall thereof. In the broadest aspect of the present invention, the rod is not necessarily threaded. This will achieve a satisfactory level of satisfaction as long as the tubular member is vertically oriented, because gravity will retain the fitting in the seated position. However, to provide an appearance of higher quality and permit the fitting to be used with horizontal tubular members, the rod should be threaded and fit into a threaded receptacle with the tubular member.

It is therefore an object of the present invention to provide a unique ornamental fitting for tubular furniture.

It is another object of the present invention to provide an ornamental fitting of the type described which joins two spaced, confronting, axially aligned, tubular members.

A further object of the present invention is to provide an ornamental ceramic fitting of the type described in which the distance between the ends of the tubular members is less than the corresponding axial length of the ceramic fitting.

Other objects and a fuller understanding of the invention will become apparent upon reading the following detailed description of a preferred embodiment along with the accompanying drawings in which FIG. 1 is a perspective view of a piece of furniture having end standards formed of tubular members of the type for which the present invention was developed, illustrating the fitting of the present invention emplaced thereon;

FIG. 2 is a perspective view of the fitting of the present invention looking at one end thereof;

FIG. 3 is a sectional view of the fitting of the present invention;

FIG. 4 is a sectional view similar to FIG. 3, except showing the ceramic fitting emplaced between two spaced, confronting, axially aligned, tubular members; and FIGS. 5-7 are elevation views showing the procedure for mounting the fitting of the present invention.

DETAILED DESCRIPTION OF A PREFERRED EMBODIMENT

Turning now to the drawings, there is illustrated in FIG. 1 a piece of furniture 10 of the type described hereinabove and with which the present invention is contemplated. As is illustrated in FIG. 1, an exemplary type of tubular furniture construction is a vanity bench 10 which includes a pair of spaced end walls 12,14 separated by a seat 16 and stabilizing bars 15,17. The end wall 14 is exemplary and is formed of a plurality of curved tubular members 18,20,22. A straight tubular member 24 connects the curved tubular member 22 and the lower rail 23.

As suggested by the foregoing discussion, the aesthetic effect of end wall 14 is a plurality of tubular, parallel members having humps or curves at the top thereof. Some type of ornamental, perhaps colorfully decorated fitting might be inserted in one or more of the straight tubular members to add some variance in the very plain appearance thereof. For this purpose, the present invention is directed to an ornamental fitting 26 which is inserted into the length of tubular member 24. It is apparent that other tubular members, such as curved members 18 or 20 might also or alternatively be provided with the decorative fittings of the type illustrated at 26. Additionally, it is desirable to be able to mount and connect the fitting 26 to tubular member 24 after the end wall 14 is fabricated, assembled, and plated.

Turning now to FIG. 2, there is illustrated the ornamental fitting or connector 26 in accordance with the preferred embodiment of the present invention. A ceramic, preferably porcelain, body member 28 includes a rod 30 extending axially thereof. The threaded rod 30 may be embedded in the body member 28 in accordance with any conventional technique, such as by molding the ceramic member around the threaded rod, cementing the threaded rod in an axial passageway providing the ceramic member with a threaded insert through which the rod may be threaded, or other similar techniques. For stability the threaded rod extends axially of the body member 28 and one end 30a thereof protrudes from a first end 28a of body member 28. As illustrated in FIG. 2, the other end 30b of the threaded rod 30 terminates substantially coextensively with the second end 28b of the fitting 28. Also as earlier described, while a threaded rod provides a more secure, sturdier construction, in situations where the tubular member 24 is substantially vertical, the threads might be omitted. In such cases the rod would act as a seating pin or stud.

Turning now to FIG. 3, there is illustrated the ceramic fitting 26 which includes the ceramic (preferably porcelain) body member 28 having the threaded rod 30 extending therethrough. At the first end 28a of the body member 28, there is provided a well 32 which surrounds the threaded rod 30 to a prescribed depth. Similarly, a second well 34 is provided in the second end 28b of body member 28 which surrounds the other end 30b of threaded rod 30. A rubber or resilient pad 36 is placed in the bottom of well 34 surrounding the threaded rod 30. While a ceramic body member is described herein, it is apparent that the material of the fitting is not critical and could be altered as desired.

As can be seen from FIG. 4, the distance between threaded rod 30 and the walls of wells 32, 34 is slightly greater than the wall thickness of tubular member 24 so as to receive the walls of the tubular member as the threaded rod is twisted, screwed, or otherwise assembled thereinto.

In FIG. 4, there is illustrated the fitting 26 emplaced between the confronting ends of the tubular portions 24a, 24b. The tubular portions 24a, 24b may be provided with threaded receptacles (nuts) 25, as illustrated, or the interior walls of the tubular members could themselves be threaded. While the tubular portions 24a, 24b are separated by the distance a, the length of the fitting 26 is represented by dimension b. Therefore, the axial dimension of fitting 26 is greater than the distance between the opposed ends of tubular members 24a, 24b by the first distance c. This occurs because, when fully seated between tubular members 24a, 24b, it is desired that the decorative fitting 26 have the appearance of enveloping the tubular members, rather than merely abutting them. In order to achieve this result, it is then necessary that the first well 32 have a depth dimension at least as great as, and preferably greater than, the aforesaid first distance c, which is the difference in the length of the fitting 26 and the distance between tubular members 24a, 24b. So arranged, the first end 28a may be positioned on the corresponding end 24a of the tubular member and pushed or twisted to a point which exceeds its normal seated position by the first distance (c), thereby allowing the other end 24b of the tube to become aligned with the second end 28b of the fitting 26.

As best shown in FIGS. 5–7, the fitting is installed by:
(a) initially bending or deflecting the lower tubular member 24b slightly to allow positioning of the ornamental fitting 26 as illustrated in FIG. 5. The dotted line portion of FIG. 5 illustrates the normal position of the tubular member 24b;
(b) pushing, twisting, or screwing the ornamental fixture 26 into the upper tubular member 24a until the end of tubular member 24a is completely received within well 32. When this step is completed, the ornamental fixture 26 will be in the position shown in FIG. 6; and
(c) returning the tubular member 24b to its normal position aligned with the second end 28b of the body member 28, so that the lower end 30b of rod 30 is aligned with the open interior of the tubular member 24b. The fitting 26 is then pushed, twisted or screwed in the opposite direction until the upper end of tubular member 24b engages the rubber pad 36 or bottom of well 34.

So arranged, the ornamental fitting 26 is emplaced in its seated position with the end portion of the lower tubular member seated within well 34 and the confronting end portion of the upper tubular member 24a seated in well 32. Note from FIG. 7 that the upper member 24a will, at this time, not extend completely to the bottom of well 32.

While the description hereinabove has been directed to a preferred embodiment in which the rod 30 is threaded and protrudes upwardly from the first end 28a, neither of these features are critical to the invention. For example, the rod 30 can be merely a pin or post which is inserted in the tubular member 24a and tubular member 24b. However, the connection is more secure or tighter if the rod 30 and the end portions of tubular members 24a, 24b are threaded. Further, it is not necessary that the rod 30 extend above the upper end of ornamental fitting 26, however, the longer threaded portion lends stability to the assembly, once everything is fully seated. The stability offered by threaded rod 30 and extending it as illustrated result in a product that appears to be better constructed and of a higher quality.

While a preferred embodiment of the present invention has been described in detail hereinabove, it is apparent that various changes and modifications might be made without departing from the scope of the invention which is set forth in the accompanying claims:

What is claimed is:

1. An ornamental knob-like fitting adapted to be attached to and removed from a seated position between two axially aligned, substantially fixed, confronting tubular members without disassembly of the fitting itself, said tubular members being spaced apart a distance less than the axial length of said knob-like fitting, at least one of said tubular members being capable of flexing to a position where said members are not axially aligned, whereby, when finally seated and connected between the tubular members, the knob-like fitting envelops both ends of the confronting tubular members, said knob-like fitting comprising:

(a) a unitary body member of a prescribed shape having a first end and a second end and an axial dimension extending collinearly with the longitudinal axis of said two confronting tubular members and a diameter greater than the diameter of said tubular members;

(b) a rod member extending axially through said unitary body member and secured therein;

(c) a first and second well surrounding said rod in said first and second ends of said body member respectively;

(d) said first well having a depth dimension at least as great as the difference between the axial dimension of said fitting and said distance between said confronting tubular members, whereby said first end may be positioned on the corresponding end of one of said tubes and moved to a point which exceeds its final seated position by a distance sufficient to allow the other of said tubes to be placed in position aligned with said second end.

2. The ornamental fitting according to claim 1 wherein at least the ends of said rod are threaded externally and adapted to be received within cooperating internally threaded means within said tubular members.

3. The ornamental fitting according to claim 2 wherein said threaded rod protrudes longitudinally past said first end of said body member.

4. The ornamental fitting according to claim 1 and further including a rubber pad in the base of said second well.

5. An ornamental furniture construction for furniture of the type formed substantially of tubular members and glass, said construction comprising:

(a) two axially aligned, substantially fixed, confronting tubular members, the confronting ends of which are spaced apart by a prescribed spacing, at least one of said tubular members being capable of flexing to a position where said tubular members are not axially aligned;

(b) a unitary body member of prescribed shape having a first and second end, an axial dimension extending collinearly with the longitudinal axis of said two confronting tubular members, and a diameter greater than the diameter of said tubular members, the axial length of said knob-like body member exceeding said prescribed spacing between the confronting ends of said tubular members by a first distance;

(c) a rod member extending axially through said body member and secured therein;

(d) a first and second well surrounding said rod in said first and second ends of said body member respectively; said first well having a depth dimension at least as great as said first distance whereby said first end may be positioned on the corresponding end of one of said tubes and moved to a point which exceeds its final seated position, thereby allowing the other of said tubes to be placed in position aligned with said second end;

whereby, when finally seated, said fitting envelope both ends of said confronting tubular members.

6. The ornamental fitting according to claim 5 wherein at least the ends of said rod are threaded externally and adapted to be received within cooperating internally threaded means within said tubular members.

7. The ornamental fitting according to claim 6 wherein said threaded rod protrudes longitudinally past said first end of said body member.

8. The ornamental fitting according to claim 5 and further including a rubber pad in the base of said second well.

* * * * *